Jan. 14, 1930.  J. MAY  1,743,469
APPARATUS FOR OBSERVING THE SOLE SURFACE OF A FOOT
Filed Nov. 12, 1928
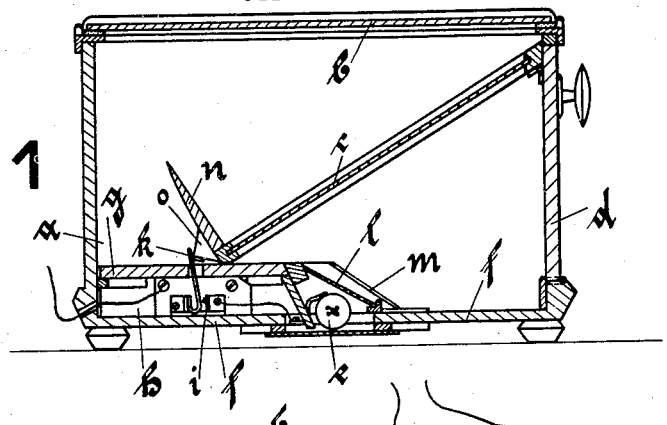
Fig: 1
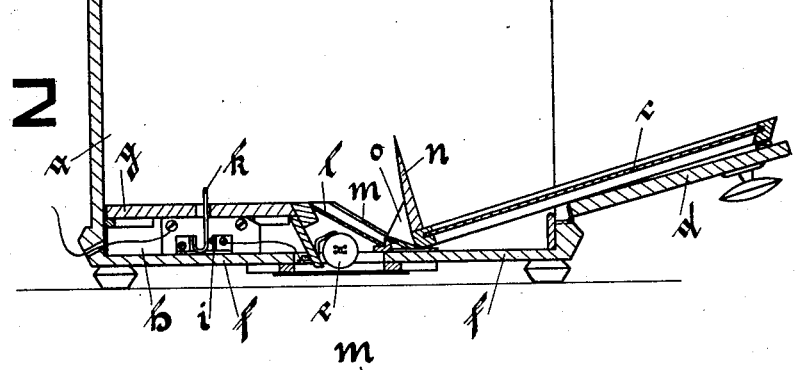
Fig: 2
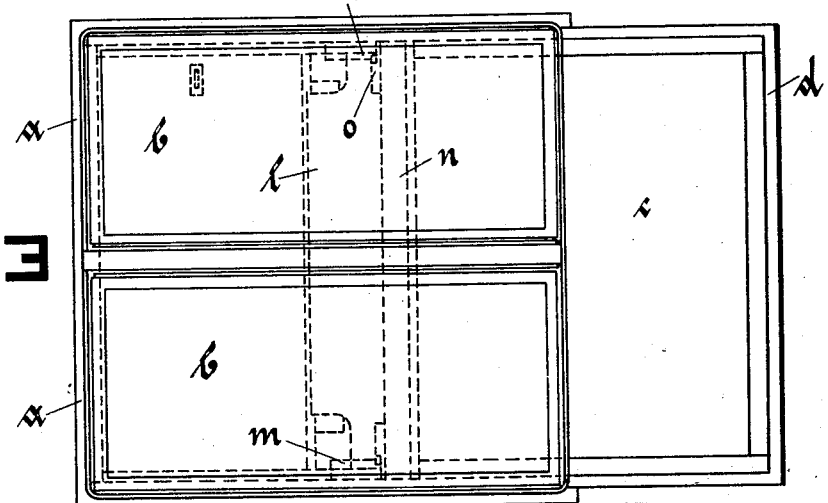
Fig: 3
INVENTOR
JOSEPH MAY
BY
ATTORNEYS.

Patented Jan. 14, 1930

1,743,469

UNITED STATES PATENT OFFICE

JOSEPH MAY, OF FRANKFORT-ON-THE-MAIN, GERMANY

APPARATUS FOR OBSERVING THE SOLE SURFACE OF A FOOT

Application filed November 12, 1928, Serial No. 318,658, and in Germany August 15, 1927.

The present invention relates to an apparatus for observing the changes which occur in the sole surface of the human foot by reason of certain diseases or in the case of a healthy foot when it is subjected to a load and when it is unloaded. Such apparatus consists of a strong transparent supporting plate of glass or the like with a mirror system arranged underneath which reflects the image of the sole surface projected through the supporting plate, upwardly so that it can there be seen conveniently.

Such apparatus are adapted for use in connection with medical examinations and for determining the fitting of foot-arch supports and the like in individual cases and constitute a valuable and indispensable accessory for doctors, orthopædists and in fact any person desiring to examine the undersurface of the foot.

The observation apparatus, according to the present invention, differs from the known apparatus having two mirrors arranged at right angles under the transparent supporting plate, by the provision of only a single mirror arranged at a suitable angular position under the transparent supporting plate, mounted in a casing, which partly projects from an open end of the casing. The angular position of the mirror may be adjustable relatively to the supporting plate.

The end of the casing may also be provided with a hinged closing wall and the mirror may have its front edge hinged to this wall in such a manner that when opening the wall it is partly withdrawn from the casing and brought into a suitable angular position, whilst when closing the wall it can be completely returned into the casing.

In the position of observation the mirror is adapted to be disposed preferably at an angle of about 20° in relation to the supporting plate. It will, however, be understood that other angles may be suitable and that the invention is not limited to the particular angle mentioned.

It is however essential that the angular position is such that the reflected sole surface of the foot can be seen in the portion of the mirror which is withdrawn from the casing.

A source of light is provided in the bottom of the casing. In order that the light rays do not fall directly upon the mirror but are directed as much as possible upwardly towards the supporting plate the mirror is provided at its edge in front of the source of light with a protecting bar so as to guide the light rays upwardly. The control of the light source may be effected automatically with the movable mirror in such a manner that when the mirror is drawn forwardly the source of light is switched on and when the mirror is moved backwardly it is switched off.

As a single mirror is provided the apparatus can be made smaller, simpler and cheaper so that it may be capable of general use.

In the accompanying drawing is illustrated by way of example one form of construction of the apparatus in which the mirror has its front edge hinged to a hinged front wall of the casing and is drawn forwardly when opening the wall and returned when closing the wall.

Figure 1 is a longitudinal section of the closed apparatus.

Figure 2 is a longitudinal section of the apparatus in the position of use, and

Figure 3 shows a plan corresponding with Figure 2.

The casing $a$ of the apparatus is closed on all sides except at the front end and is provided at the top with a transparent supporting plate $b$ of glass or the like which in the present case consists of two parts resting on a central bar, whilst a single mirror $c$ is provided which when the apparatus is in use partly projects from this and is located at such an angle relatively to the supporting plate that it is possible to view the sole surface of the foot in the portion of the mirror projecting from the casing.

The end wall $d$ of the casing is hingedly mounted and to the inner side thereof is hinged the front edge of the mirror $c$. The rear end of the mirror slides freely on the bottom of the casing. The end wall $d$ when opened assumes such a position that the mirror $c$ resting thereon has the correct or the most suitable angular position relatively to the supporting plate $b$ for observing the bottom of the foot. Stops or other suitable adjusting devices may be provided for holding the end wall $d$ in different open positions and thus the mirror $c$ at different angles relatively to the supporting plate.

The source of light $e$ is in the form of a tubular or soffit lamp which is arranged substantially at the middle of the apparatus transversally to its longitudinal axis and in the bottom $f$ thereof. The bottom $f$ is provided at the rear portion of the apparatus with a pedestal $g$ and the intermediate space serves for the reception of the lamp connections and a switch $i$ with spring contacts or a switch lever $k$ of which the free end passes through an opening in the pedestal $g$ and projects above this. Between the front portion of the bottom and the front edge of the pedestal $g$ there remains an open space which is preferably covered by a frosted glass plate $l$ under which the source of light or the lamp $e$ is located. On the two side walls of the casing are provided guide bars $m$ over which the rear edge of the mirror moves during its forward and rearward movement between the pedestal $g$ and the front portion of the bottom. A protecting wall $n$ of suitable height and of material which is non-transparent to light is secured to the lower edge of the mirror $c$ or to the frame thereof and prevents direct rays of light from the lamps from reaching the mirror. To this protecting wall there is secured in a position corresponding to the spring switch lever $k$ a projection $o$ by means of which the switch $i$ can be operated on the movements of the mirror. On both sides of the mirror there may be provided hooks which are open at the side and adapted on the forward movement of the mirror to engage behind the guide bars $m$ and retain the mirror in its forward position.

The end wall $d$ provided with a suitable handle for the manipulation thereof, is held in the closed position by any suitable known locking or bolting device.

When the apparatus is not in use (Figure 1), the ends wall $d$ is closed and the mirror $c$ is inside the casing. In this position the projection $o$ has pushed back the spring switch lever $k$ and thus broken the circuit of the lamp $e$. When the apparatus is to be used it is only necessary to lower the front wall. This moves with it the mirror $c$ into the position for observation shown in Figure 2 and by reason of the forward movement of the projection $o$, away from the spring switch lever $k$ the source of light is simultaneously and automatically switched on. Suitable adjustable and setting devices, which are well known and are not illustrated in the drawing may be provided for determining the most suitable angular position of the mirror $c$ relatively to the supporting plate $b$.

The image of the sole surface appearing through the transparent supporting plate is observed in the projecting portion of the mirror.

I claim as my invention:

1. Apparatus for observing the sole surface of a foot, comprising a casing having a transparent top and a hinged side, and a reflector beneath said top and facing said top hinged to said side and extending into said casing.

2. Apparatus for observing the sole surface of a foot, comprising a casing having a transparent top and a hinged side, a reflector within said casing beneath said top and facing said top, means whereby the opening of said hinged side draws said reflector partially out of said casing, and illuminating means within said casing.

3. Apparatus for observing the sole surface of a foot, comprising a casing having a transparent top and a side hinged at the bottom, a reflector facing said top and hinged to the top of said side and extending into said casing, illuminating means in said casing, and a shield between said illuminating means and said reflector.

4. Apparatus for observing the sole surface of a foot, comprising a casing having a transparent top and a side hinged at the bottom, a reflector facing said top and hinged to the top of said side and adapted to be partially withdrawn from said casing, and means whereby the movement of said reflector controls said illuminating means.

5. Apparatus for observing the sole surface of a foot, comprising a casing having a transparent top and a hinged side, a reflector facing said top and attached to said side and extending into said casing and adapted to be partially drawn therefrom by the opening of said side, illuminating means in said casing, and means whereby the movement of said reflector controls said illuminating means.

6. Apparatus for observing the sole surface of a foot, comprising a casing having a transparent top, a reflector facing said top and extending within said casing, means for partially withdrawing said mirror from said casing, illuminating means in said casing, a shield between said reflector and said illuminating means and means whereby the movement of said reflector controls said illuminating means.

7. Apparatus for observing the sole surface of a foot, comprising a casing having a transparent top and a side hinged at the bottom, a reflector facing said top and hinged to the top of said side and extending into the casing, illuminating means in the bottom of said casing, a shield on said reflector between said reflector and said illuminating means, and a switch controlling said illuminating means, said switch being adapted to be actuated by movement of said reflector.

8. Apparatus for observing the sole surface of a foot, comprising a casing having a transparent cover, a reflector beneath said cover and facing said cover, and means for holding said reflector partially within and partially without said casing.

9. Apparatus for observing the sole surface of a foot, comprising a casing having a transparent top, a reflector beneath and facing said top, and means for holding said reflector partially within and partially without said casing and at an angle to said top.

10. Apparatus for observing the sole surface of a foot, comprising a casing having a transparent top and a side hinged at the bottom, a reflector facing said top and pivotally attached at one end to the top of the hinged side and extending into said casing, illuminating means in the bottom of said casing, a shield on said reflector between said illuminating means and the surface of said reflector, a switch controlling said illuminating means, a member on said reflector adapted to engage the handle of said switch, and guides on which the end of said reflector opposite to the pivoted end moves, whereby the opening of said hinged side holds said reflector partially withdrawn from the casing and at an angle to the top, and the movement of said reflector controls said illuminating means.

In testimony whereof I have affixed my signature.

JOSEPH MAY.